United States Patent [19]
Don et al.

[11] Patent Number: 5,868,888
[45] Date of Patent: Feb. 9, 1999

[54] NEAR NET-SHAPE FABRICATION OF FRICTION DISK RING STRUCTURES

[76] Inventors: Jarlen Don, 25 Mound Ct., Carbondale, Ill. 62901; Jar-Shuen Don, No. 18 Alley 15 Lane 603, Ding-Jong Road, Sanming, Kaohsiung, Taiwan; Chia-Yu Tang, 4F No. 26, 133 Alley, Ann-Ming Street, Shing Ten City, Taipei, Taiwan

[21] Appl. No.: 781,458

[22] Filed: Jan. 10, 1997

Related U.S. Application Data

[60] Provisional application No. 60/013,726 Mar. 20, 1996.
[51] Int. Cl.⁶ ..................................................... B32B 31/00
[52] U.S. Cl. ............................................................ 156/157
[58] Field of Search ..................................... 156/227, 204, 156/304.1, 157

[56] References Cited

U.S. PATENT DOCUMENTS

| | | | |
|---|---|---|---|
| 368,490 | 8/1887 | Philion | 156/304.1 X |
| 2,582,065 | 1/1952 | Rasor | 156/304.1 X |
| 4,066,489 | 1/1978 | Hannum et al. | 156/304.1 X |

*Primary Examiner*—Francis J. Lorin
*Attorney, Agent, or Firm*—Peter R. Bahn

[57] ABSTRACT

Disclosed is a method for near net-shape fabrication of friction disk ring structures in which trapeziform paneled strips of friction paper or cloth are folded to make uniform 2-ply disks.

6 Claims, 8 Drawing Sheets

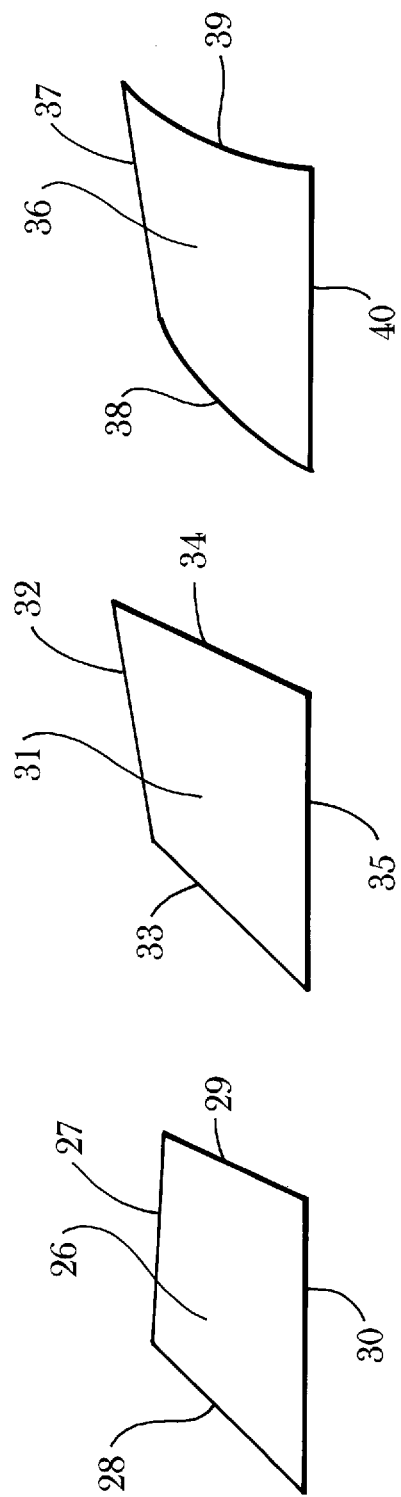

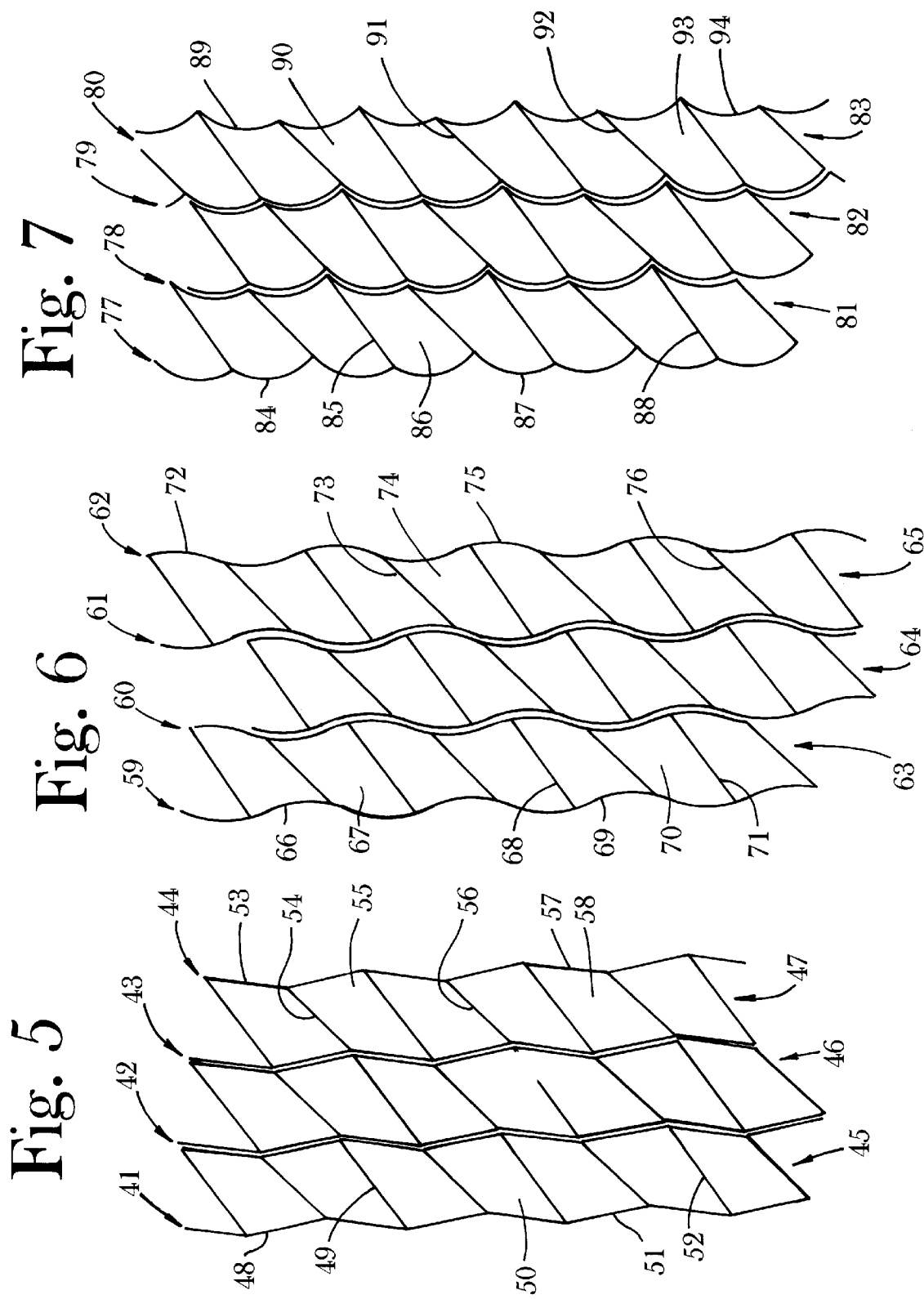

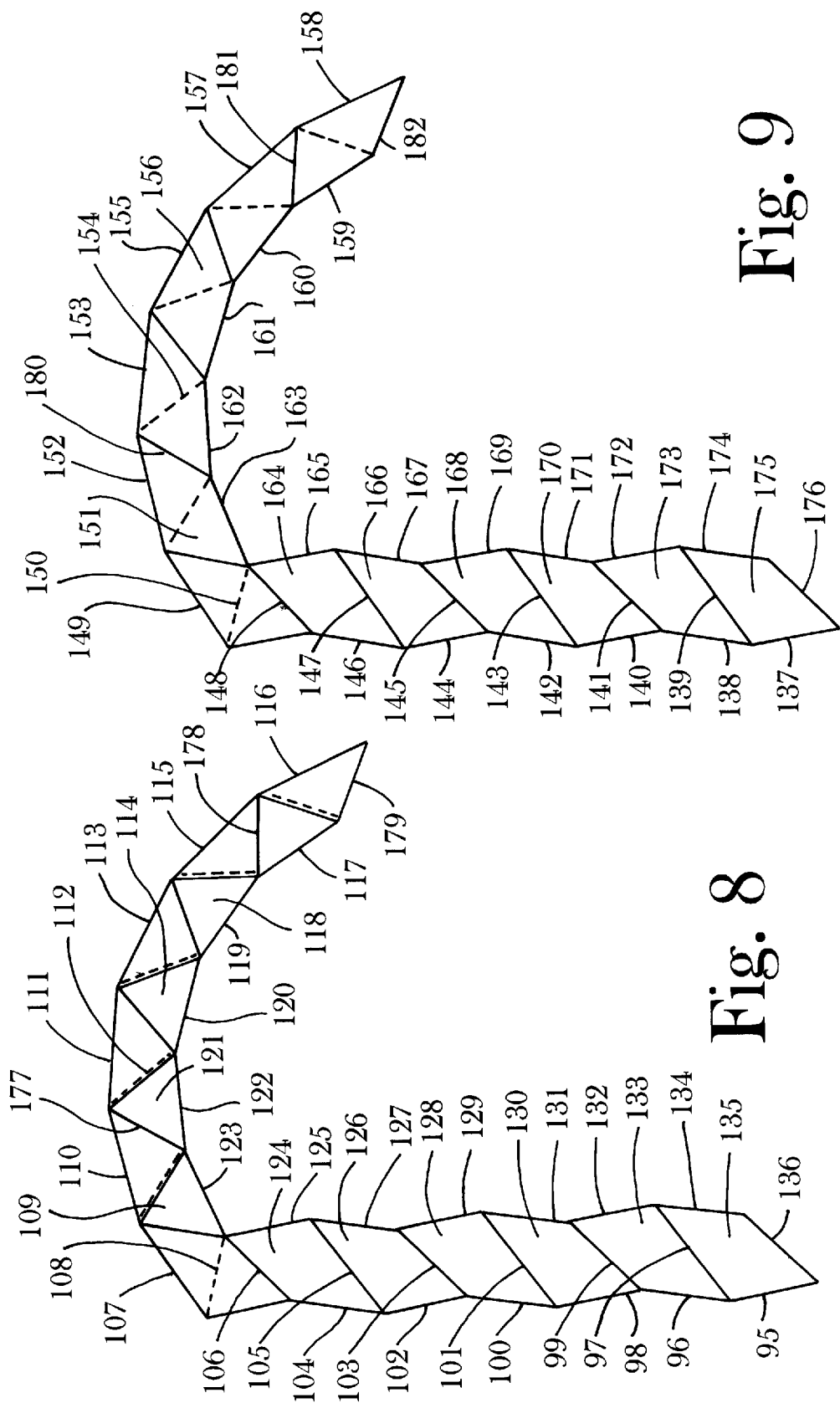

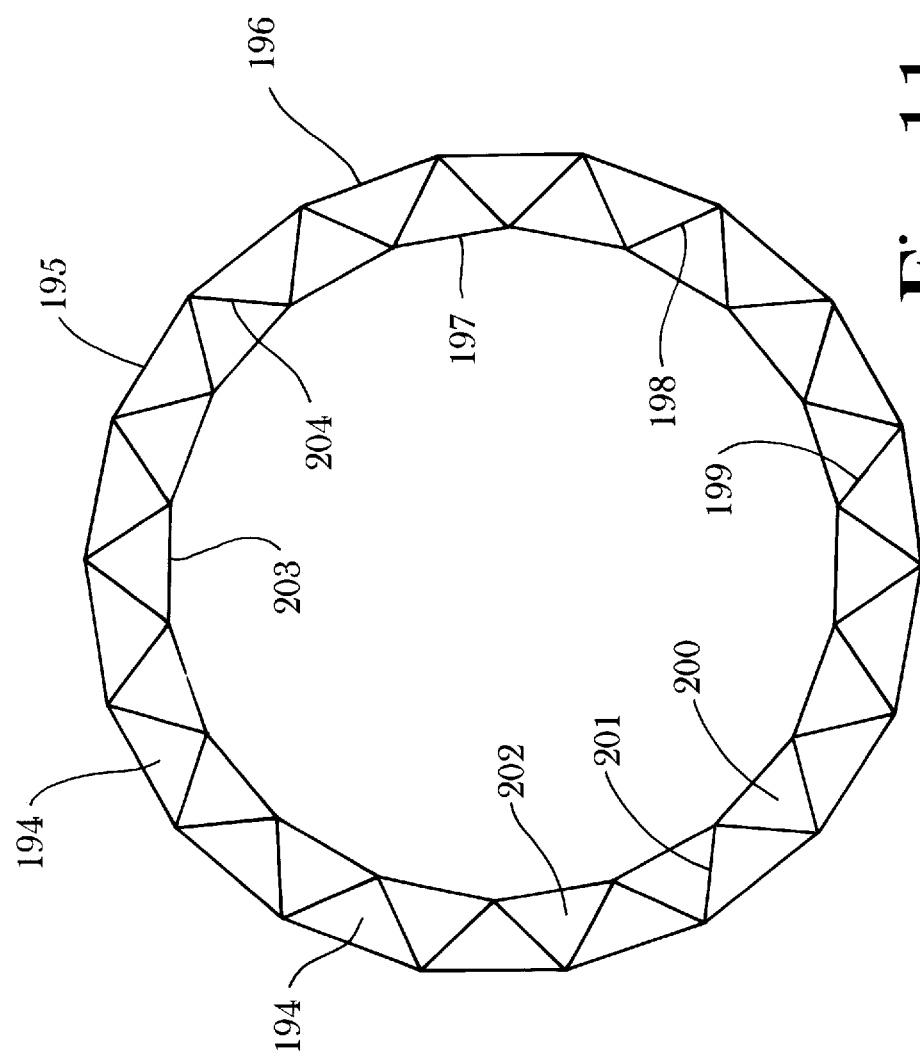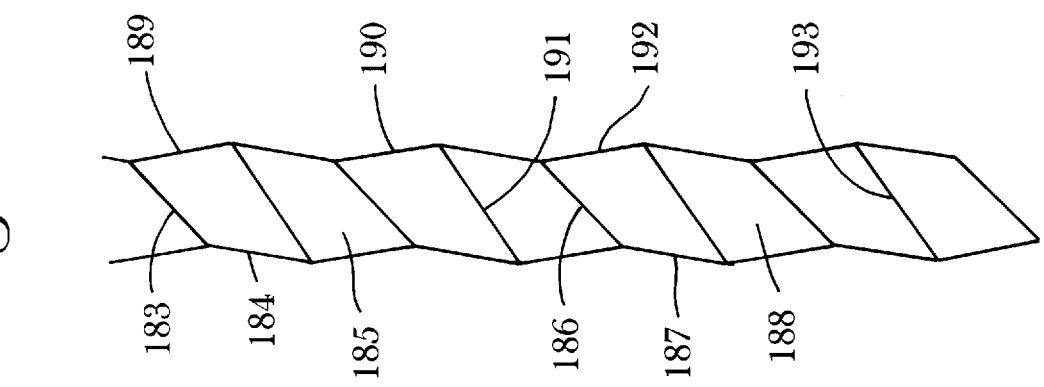

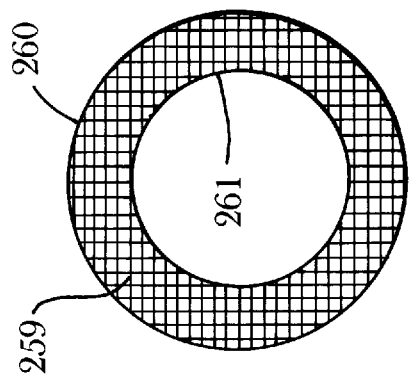
Fig. 18
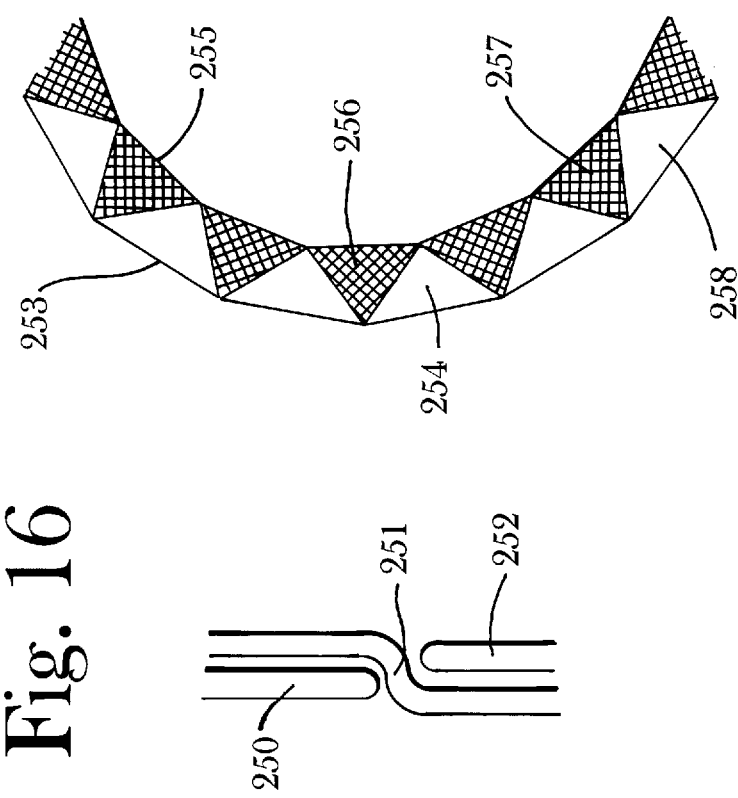
Fig. 17
Fig. 16

NEAR NET-SHAPE FABRICATION OF FRICTION DISK RING STRUCTURES

PRIOR APPLICATION DATA

This is a formal patent application based on a provisional patent application, Ser. No. 60/013,726 filed Mar. 20, 1996.

FIELD OF THE INVENTION

This invention fits into the broad field of mechnanical arts. More particularly, it fits into the field of sheet material manipulation in transport vehicle manufacture. Specifically, it relates to methods for the manufacture of friction disk rings for brakes and clutches in vehicles such as automobiles and airplane landing gear.

The invention herein disclosed is for new friction materials (paper, thin disks, cloths) for transmission, clutch, and brake applications.

BACKGROUND OF THE INVENTION

A survey of background and prior art in the fields of this invention reveals the following. Stimson and Dowell in U.S. Pat. No. 3,934,686 teach carbon disk brakes with keyway formations reinforced by filament carbon inserts. Zarembka in U.S. Pat. No. 4,187,932 discloses the use of pyrolyzed carbon-containing ribbon wrapped radially around a brake disk core. Resin is then added, and the assembly pyrolyzed to obtain an integral brake disk. Wiseman and Kovac in U.S. Pat. No. 4,286,694 present brake disks of carbon or other porous material which contain grooves on opposing surfaces so as to vent steam or other gases generated during braking. Bauer in U.S. Pat. No. 4,291,794 reveals the use of various mixtures of pyrolytic carbon and graphite assemblies and also cross-hatched grooves in such assemblies for power transmission clutches. Taylor in U.S. Pat. No. 4,297,307 discloses means for assemblying carbon-carbon fiber composites used for aircraft bake disks. Chareire in U.S. Pat. No. 4,457,967 reveals brake disks utilizing carbon-carbon composite materials with carbon fibers of different lengths oriented in different directions relative to the plane of the disks. Winckler in U.S. Pat. No. 4,700,823 teaches the use of carbon vapor deposition (CVD) in preparing oil lubricated clutch assemblies. Fox and East in U.S. Pat. No. 4,778,548 teach bonding woven carbon fabric friction materials in which the tendency of bonding adhesives to bleed through the pores of the friction material are reduced. Tilton and Sorce in U.S. Pat. No. 4,846,326 present a friction clutch which allows uniform distribution of friction loads over carbon plates. Guichard in U.S. Pat. No. 4,890,700 reveals carbon disk brake rotors fitted with reinforcing riders which fit into trapezoidal-shaped drive notches around the periphery of such rotors. Seiz and Eldridge in U.S. Pat. No. 5,083,650 teach an automated process for making friction material having heat-resistant paper support bearing resin-bonded carbon particles. Bommier and Chareire in U.S. Pat. No. 5,242,746 disclose various friction elements of composite carbon-carbon materials and differential textures. Prud'Homme in U.S. Pat. No. 5,325,948 presents a clutch with structural carbon-carbon friction plates. Chareire and Salem in U.S. Pat. No. 5,405,650 reveal a process for producing carbon-carbon brake disks with holes arranged in it to allow better CVD compregnation. Bernal, Hendrix, and Tilton in U.S. Pat. No. 5,415,262 disclose a carbon to carbon friction mechanism Carbon-fiber cloth is made by mixing powdered carbon with poly-acrylyl-nitrile (PAN), a liquid polymer. This mixture is made into fiber. The fiber is woven into cloth. The cloth is the heated to about 1000 degrees C. for a few hours. All of the organic material burns up, leaving pure carbon-fiber cloth.

Stitching carbon-fiber cloth doesn't compress it as much as does hot pressing it. This is important because hot pressing carbon-fiber cloth results in a lower fiber volume of fraction materials made from the cloth. The cloth can then be built up with carbon vapor deposition (CVD) which is thought to be an advantageous form of carbon use in friction surfaces. However, stitching carbon fiber cloth is thought to be advantageous in the following manner: The carbon-fiber used to stitch layer of friction materials together is generally oriented perpendicular to the outer exposed friction surface which allows said fibers to conduct heat away from the exposed friction surface for better wear.

As currently practiced in the art, a typical disk will have an inner diameter (ID) of 4.175 inches and a outer diameter (OD) of 4.98 inches. Typical disks can be made of "papers" composed of randomly oriented resin binder, KEVLAR polymeric fiber, reycled materials, and filler. Disks can also be made of woven (i.e. nonrandomly oriented) carbon-carbon fiber cloth (as for example in Eaton/Hitco disks) described previously.

But "papers" and carbon-carbon fiber cloth are expensive and suffer from a very low materials utilization rate. That is, there is high waste of sheet or cloth materials as currently utilized in art field of friction disk fabrication. For example, if 1-ply rings with ID of 4.175 in. and OD of 4.98 in. are cut from a rectangular sheet, it can be calculated that there will be a 73% waste of material. In the automotive transmission industry, friction paper waste can be as high as 80%–90%.

BRIEF DESCRIPTION OF THE INVENTION

The American Heritage Dictionary of the English Language, 3rd Edition (Houghton Mifflin Co., New York, 1996) defines the word trapezoid as follows: a quadrilateral having two parallel sides. The said dictionary defines the word trapezium as follows: a quadrilateral having no parallel sides. The said dictionary also defines the word trapeziform as follows: shaped like a trapezium. A quadrilateral is a plane figure with four sides and four angles. Such definitions will be used in the invention described here.

This invention is practiced in the following manner:
1. Carbon-fiber (or other friction material) cloth is cut into tiled trapeziform strips. 2. The strips are folded in a zig-zag pattern into disk ring structures. 3. The disk ring structures are either hot-pressed or stitched to preserve the disk ring structures. 4. The rings are applied to brakes, clutches, etc. by adhesives by techniques well known to those in the field of art.

This invention produces nicely overlaid 2-ply disk ring with nearly 100% friction cloth material utilization. This invention also can be utilized to form rings of any desired thickness that are 2-ply or above by folding an "endless" trapeziform strip into an "endless" spiral ring with turns of the ring being overlaid one on top of the other until any desired thickness for the ring is reached. "Endless" strip folding into "endless" spiral rings structures is a process that can easily be automated.

This invention has the following advantages:
1. The product has uniform overlay. There is a double layer everywhere and no gaps between adjoining trapeziform edges. 2. The trapeziform panel edges form groove patterns similar to those commonly found in the industry. 3. The trapeziform panels can be varied in style and size. 4. Any size ring disks can be manufactured. 5. The ring width can be made slightly larger than needed, and the corners trimmed and rounded off to fit the desired size. 6. In this method, there is nearly 100% material utilization since the geometry is simple. 7. This method presents excellent opportunities for automation and continuous fabrication. 8. This method produces uniform interleaved 2-ply thickness for the disk ring. 9. This method allows controlled uniform fiber orientation around the ring unlike current ring fabrication methods. 10. Thick disk rings (for aircraft brakes, for example) can be made by multiple layers of continuously manufactures disk ring as a compressed spiral. 11. One-way folding can also be used instead of zig-zag folding although zig-zag folding is probably better suited for automation and continuous fabrication.

DESCRIPTION OF THE DRAWINGS

FIG. 2 shows a trapezoidal-shaped panel.

FIG. 3 shows a trapeziform panel.

FIG. 4 shows a trapeziform panel with curved sides.

FIG. 5 demonstrates how friction fabric is cut into tiled trapeziform paneled strips.

FIG. 6 demonstrates how friction fabric is cut into tiled trapeziform paneled strips with curved sides.

FIG. 7 also demonstrates how friction fabric is cut into trapeziform paneled strips with curved sides.

FIG. 8 demonstrates how trapeziform paneled strips are zig-zag folded into friction disk rings.

FIG. 9 demonstrates how trapeziform paneled strips are one-way folded into friction disk rings.

FIG. 10 and FIG. 11 show a trapeziform paneled strip and the friction disk ring structure into which the strip folds, respectively.

FIG. 16 shows a cross-sectional view of a zig-zag folded disk ring structure.

FIG. 17 shows the radial symmetry of woven zig-zag folded friction disk ring structures.

FIG. 18 shows the radial asymmetry of friction disk ring under current fabrication methods.

DETAILED DESCRIPTION OF THE INVENTION

Figure 1:
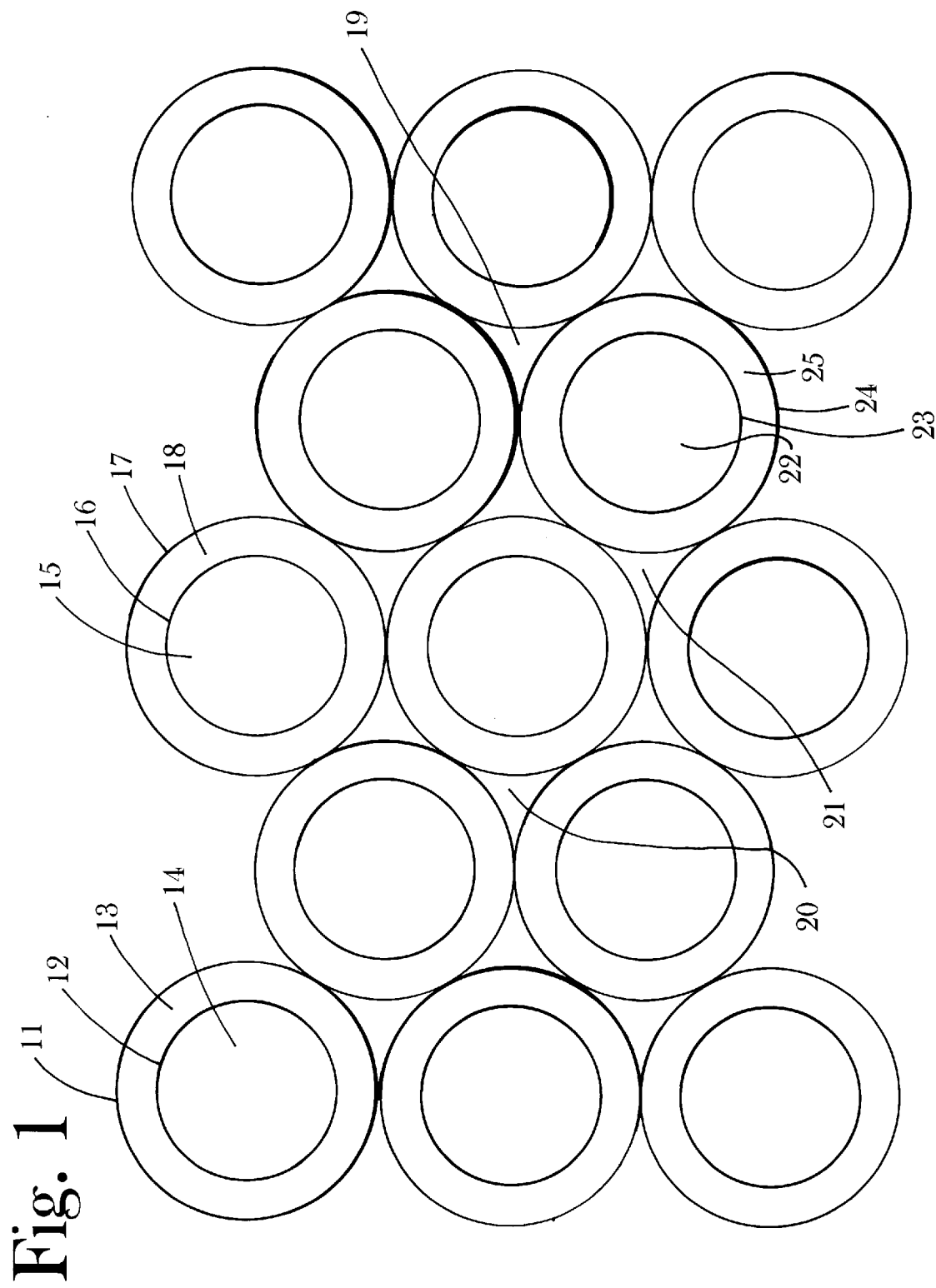
FIG. 1 depicts how friction disk rings are currently cut from friction fabrics under current technology.

FIG. 1 depicts how friction disk rings are currently cut from friction fabrics under current technology. The disk rings 13, 18, and 25, possessing respectively inner diameters of 12, 16, and 23, and possessing respectively outer diameters of 11, 17, and 24, are taken as examples of disk rings cut from hexagonal arrays. However, hexagonal array cutting of disk rings results in much waste of friction fabric as examplified by the wasted interiors 14, 15, and 22, of the aforesaid ring disks, and also the wasted exteriors 20, 21, and 19, between the ring disks. Wastage is important because friction fabrics, such as carbon fiber cloth or KEVLAR polymeric fiber "paper" are quite expensive.

FIG. 2 shows a trapezoidal-shaped panel 26. A trapezoid is a quadrilateral plane figure in which two sides are parallel. The longest edge of the trapezoid 30 is called the base of the trapezoid. The edge opposite to the base is called the top 27 of the trapezoid the two edges 28 and 29 adjacent to the base are called the sides of the trapezoid. In FIG. 2, the base 30 and the top 27 of the trapezoid are parallel, but the sides 28 and 29 of the trapezoid are not parallel.

FIG. 3 shows a trapeziform panel 31. A trapezium is a quadrilateral plane figure in which no sides are parallel. The longest edge of the trapezium 35 is called the base of the trapezium. The edge opposite to the base is called the top 32 of the trapezium. The two edges 33 and 34 adjacent to the base are called the sides of the trapezium. In FIG. 3, no sides of the trapezium are parallel.

FIG. 4 shows a trapeziform panel 36 with curved sides. The base 40 and the top 37 are straight edges but the two sides are curved. No sides are parallel.

FIG. 5 demonstrates how friction fabric is cut into tiled trapeziform paneled strips. Three trapeziform paneled strips 45, 46, and 47, are shown. Such strips are made by cutting the friction fabric at locations 41, 42, 43, and 44. As can be seen, there is no wasted material between the strips because of their tiled nature. Thus, edge portions of the strips such as 48, 52, 53, and 57, utilize friction fabric right up to the edges of adjacent strips cut in the fabric. The strips comprise trapeziform panels such as 50, 55, and 58, placed alternately base-to-base, such as at 49, 52, and then top-to-top, such as at 54, 56.

FIG. 6 demonstrates how friction fabric is cut into tiled trapeziform paneled strips with curved sides. Three trapeziform paneled strips 63, 64, and 65, are shown. Such strips are made by cutting the friction fabric at locations 59, 60, 61, and 62. As can be seen, there is no wasted material between the strips because of their tiled nature. Thus, curved edge portions of the strips such as 66, 69, 72, and 75, utilize friction fabric right up to the edges of adjacent strips cut in the fabric. The strips comprise trapeziform panels with curved sides such as 67, 70, and 74, placed alternately base-to-base, such as at 68, 71, and then top-to-top, such as at 73, 76.

FIG. 7 demonstrates how friction fabric is cut into other tiled trapeziform paneled strips with curved sides. Three trapeziform paneled strips 81, 82, and 83, are shown. Such strips are made by cutting the friction fabric at locations 77, 78, 79, and 80. As can be seen, there is no wasted material between the strips because of their tiled nature. Thus, curved edge portions of the strips such as 84, 87, 89, and 94, utilize friction fabric right up to the edges of adjacent strips cut in the fabric. The strips comprise trapeziform panels with curved sides such as 86, 90, and 93, placed alternately base-to-base, such as at 85, 88, and then top-to-top, such as at 91, 92.

FIG. 8 demonstrates how trapeziform paneled strips are zig-zag folded into friction disk rings. The unfolded portion of the strip shows trapeziform panels 135, 133, 130, 128, 126, and 124. This strip is about to be zig-zag folded at the bases 97, 101, 105, and tops 136, 99, 103, and 106, such that the base folds will become the outer diameter of the folded disk ring structure and that the top folds will become the inner diameter of the folded disk ring structure. Zig-zag folding means to press the folded strip panels together like an accordion to form the disk ring as shown in the upper portion of FIG. 8. When the straight strips have been zig-zag folded as shown in FIG. 8, the edges or sides of the panels such as 104, 102, 100, 98, 96, 95, 134, 132, 131, 129, 127, and 125, end up forming the internal boundaries of triangular-shaped panels that form the surfaces of the folded disk ring structures. Thus, in the upper portion of FIG. 8 are shown triangular surface panels 109, 121, 114, and 118. Triangular panel internal boundaries 177, 112, and 178 are shown. The outer diameter edges 107, 110, 111, 113, 115, and 116, of the folded structure are the bases of the folded trapeziform panels. The inner diameter edges 123, 122, 120, 119, and 117, of the folded structure are the tops of the folded trapeziform panels. One can also imagine that structure shown in FIG. 8 is an "endless" trapeziform paneled strip that is being folded into an "endless" triangular paneled disk ring structure circling underneath itself like a slinky toy to form a many layered disk ring structure. The zig-zag folding of "endless" strips into "endless" disk ring structures by automated machine methods immediately suggests itself upon contemplation of this invention.

FIG. 9 demonstrates how trapeziform paneled strips are one-way folded into friction disk rings. The unfolded portion of the strip shows trapeziform panels 175, 173, 170, 168, 166, and 164. This strip is about to be one-way folded at the bases 139, 143, 147, and tops 176, 141, 145, and 148, such that the base folds will become the outer diameter of the folded disk ring structure and that the top folds will become the inner diameter of the folded disk ring structure. One-way folding means to wrap the folded strip panels around each other either in a clockwise direction or in a counterclockwise direction. FIG. 9 shows a strip that is being one-way folded in a clockwise direction. When the straight strips have been one-way folded as shown in FIG. 9, the edges or sides of the panels such as 137, 138, 140, 142, 144, 146, 174, 172, 171, 169, 167, and 165, end up forming the internal boundaries of the trapeziform panels that form the surfaces of the folded disk ring structures. Thus, in the upper portion of FIG. 9 are shown trapeziform surface panels 151 and 156. Trapeziform panel internal boundaries 180 and 181 are shown. The outer diameter edges 149, 152, 153, 155, 157, and 158, of the folded structure are the bases of the folded trapeziform panels. The inner diameter edges 163, 162, 161, 160, and 159, of the folded structure are the tops of the folded trapeziform panels. One can also imagine that structure shown in FIG. 9 is an "endless" trapeziform paneled strip that is being folded into an "endless" trapeziform paneled disk ring structure circling underneath itself like a slinky toy to form a many layered disk ring structure. The one-way folding of "endless" strips into "endless" disk ring structures by automated machine methods does not immediately suggest itself. This is in contrast to zig-zag folding which appears much more practical for automation. Consequently, zig-zag folding will be emphasized as the most practical embodiment of this invention in what follows.

FIG. 10 and FIG. 11 show a trapeziform paneled strip and the friction disk ring structure into which the strip folds, respectively. Thus, FIG. 10 shows the strip comprised of trapeziform panels such as 185 and 188. The strip is folded up along bases such as 191 and 193, and tops such as 183 and 186, such that the bases form the outer diameter and the tops form the inner diameter of the associated disk rings shown in FIG. 11. The sides of the strip in FIG. 10 such as 184, 186, 189, 190, and 192, form the inner triangular panel boundaries such as 204, 198, 199, and 201, in FIG. 11.

Figure 13:
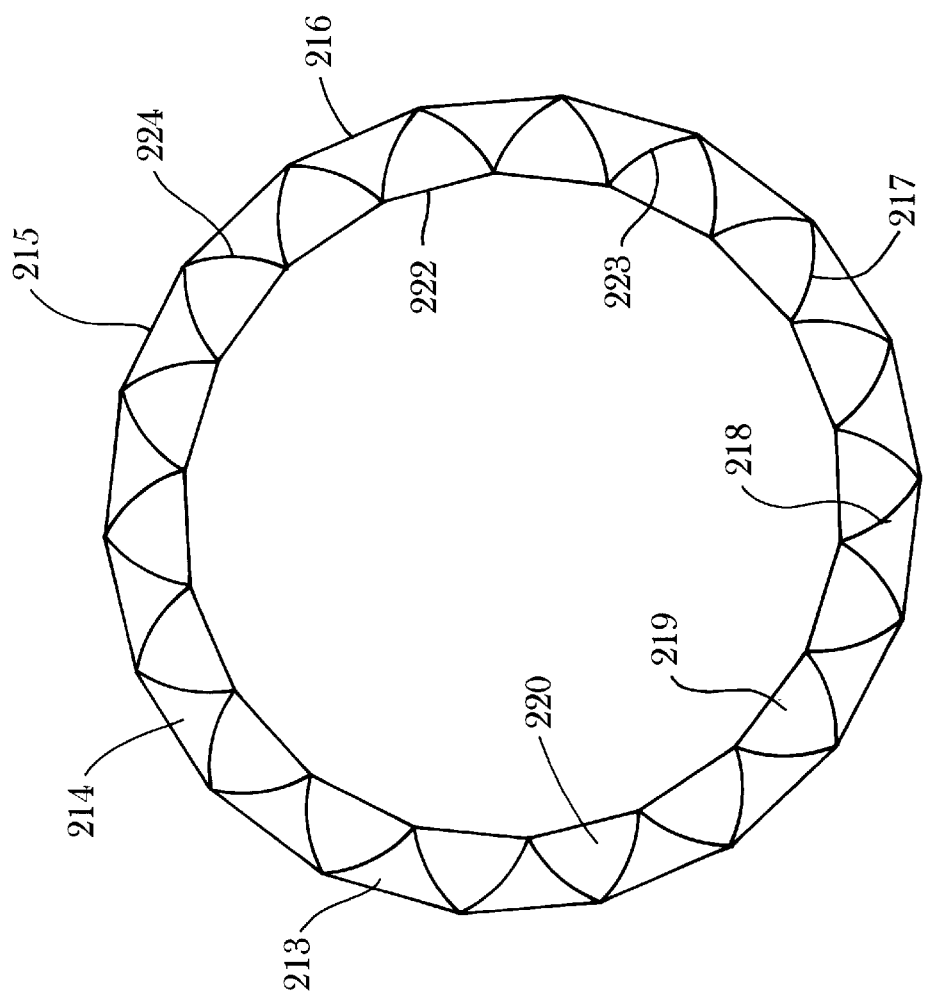
FIG. 12 and FIG. 13 show a curved trapeziform paneled strip and the friction disk ring structure into which the strip folds, respectively.
Figure 12:
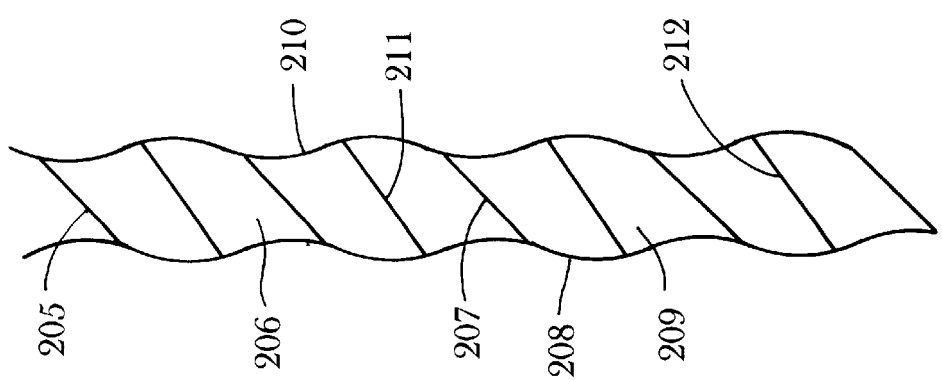

FIG. 12 and FIG. 13 show a curved trapeziform paneled strip and the friction disk ring structure into which the strip folds, respectively. Thus, FIG. 12 shows the strip comprised of trapeziform panels such as 206 and 209. The strip is folded up along bases such as 211 and 212, and tops such as 205 and 207, such that the bases form the outer diameter and the tops form the inner diameter of the associated disk ring shown in FIG. 13. The curved sides of the strip in FIG. 12 such as 208 and 210 form the curved inner triangular panel boundaries such as 224, 223, and 218, in FIG. 11. Curved triangular panels such as 220 and 219 as shown in FIG. 13 will give friction disk ring structures different performance characteristics than non-curved triangular panels such as those in FIG. 11. It should also be noted that the curved triangular panels in FIG. 13 are radially symmetric in the disk ring structure.

Figure 15:
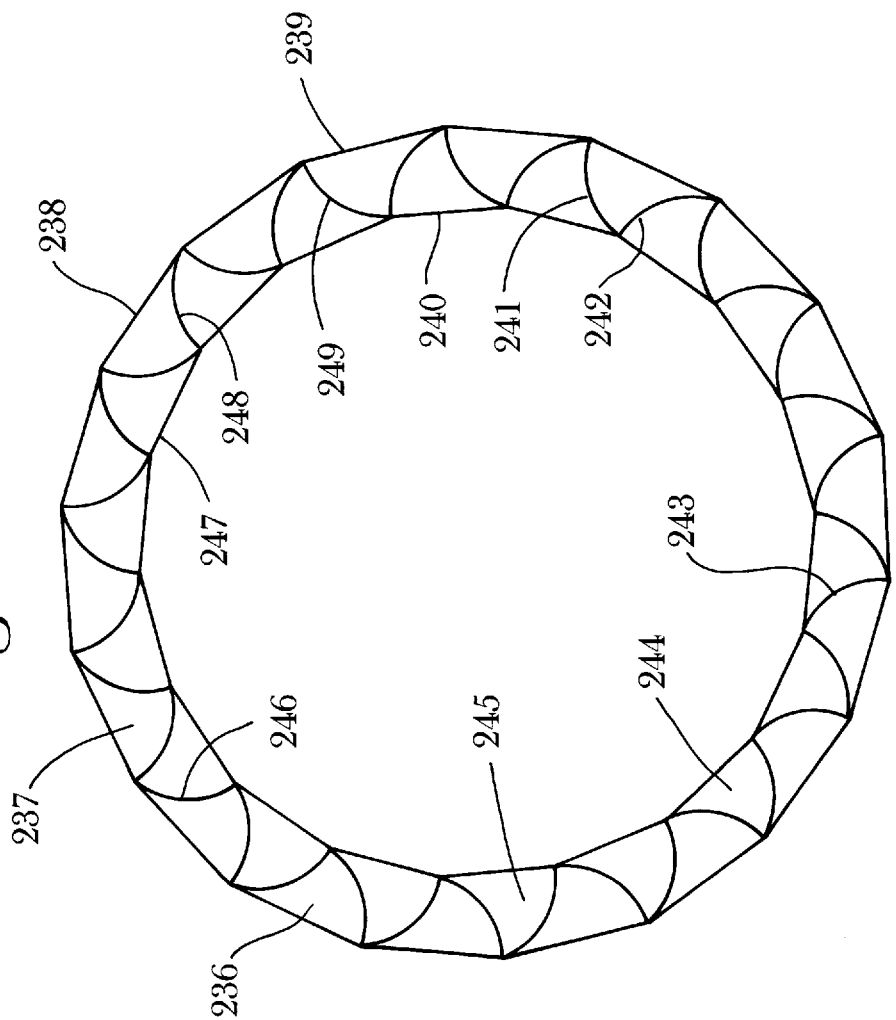
FIG. 14 and FIG. 15 show another curved trapeziform paneled strip and the friction disk ring structure into which the strip folds, respectively.
Figure 14:
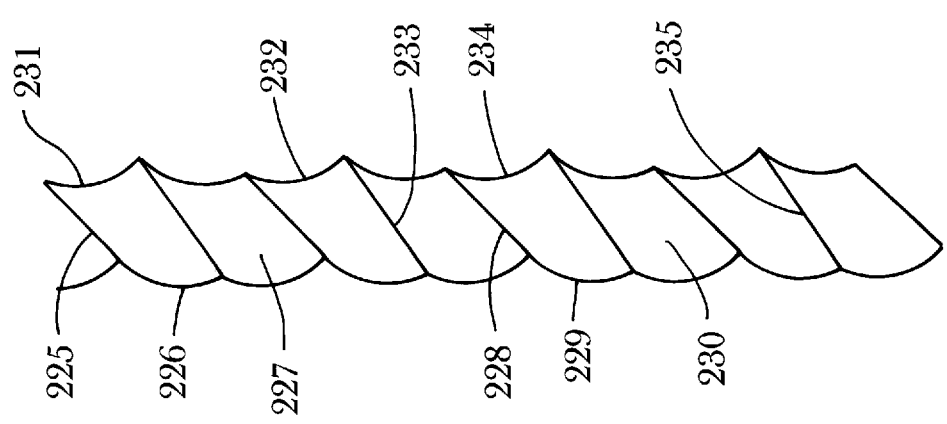

FIG. 14 and FIG. 15 show another curved trapeziform paneled strip and the friction disk ring structure into which the strip folds, respectively. Thus, FIG. 14 shows the strip comprised of trapeziform panels such as 227 and 230. The strip is folded up along bases such as 233 and 235, and tops such as 225 and 228, such that the bases form the outer diameter and the tops form the inner diameter of the associated disk ring shown in FIG. 15. The curved sides of the strip in FIG. 14 such as 226, 229, 231, 232, and 234, form the curved inner triangular panel boundaries such as 246, 248, 241, 242, 249 and 243 in FIG. 15. Curved triangular panels such as 237, 244, and 219, as shown in FIG. 15 will give friction disk ring structures different performance characteristics than non-curved triangular panels such as those in FIG. 11. It should also be noted that the curved triangular panels in FIG. 15 are radially asymmetric in the disk ring structure.

FIG. 16 shows a cross-sectional view of a folded disk ring structure. The plane of the disk is perpendicular to the view shown in FIG. 16. It can be seen that when the trapeziform paneled strips of "paper" are folded into the disk ring structures, a uniform two-ply layering of paper results. Thus, one paper 250 and another paper 252 are interleaved by paper 251.

FIG. 17 shows the radial symmetry of woven zig-zag folded friction disk ring structures. Friction paper has randomly oriented fibers with respect to the plane of the paper. However, cloth which is woven possesses fibers that are oriented in only two directions, horizontally and vertically. Such is the case, for example with pure carbon fiber cloth, utilized in high performance fraction applications. When a friction cloth if folded into a disk ring structure according to this invention, the resulting disk ring structure possesses a radial symmetry of fibers with respect to the center of the disk. Thus, in FIG. 17, the disk ring structure with outer diameter 253 and inner diameter 255 possesses triangular panels 256, 254, 257, and 258, with the fibers of such panels all being oriented with respect to the disk center, in a symmetric fashion.

FIG. 18 shows the radial asymmetry of friction disk ring under current fabrication methods. Thus, FIG. 18 shows what the fiber orientation of a disk ring cut from carbon fiber cloth would look like if such disk ring was cut from a fabric as shown in FIG. 1. In FIG. 18, the disk ring of outer diameter 260 and inner diameter 261 possesses fibers 259 that are not symmetric with respect to the center of the disk. The importance of radial fiber symmetry for friction disks is that friction characteristics remain constant at any location on the surface. In friction disks that are radially asymmetric, friction characteristics vary at different locations around the disk. In some applications this makes a difference but in other applications it does not.

What is claimed is:

1. A method for fabricating sheet material into disk ring structures comprising:

cutting the said sheet into tiled linear strips of trapeziform panels alternating in right side up—up side down orientation along the length of said strips such that the tops of the said trapeziforms are coincident to the tops of other trapeziforms and that the bottoms of the said trapeziforms are coincident to the bottoms of other trapeziforms;

folding the said strips along all of the coincident trapeziform tops and coincident trapeziform bottoms in zig-zag pattern or a one-way pattern such that the bases of the said trapeziform panels are side-to-side to form the outer diameter of the said ring structures and such that the tops of the said trapeziform panels are placed consecutively side-to-side to form the inner diameter of said ring structures such that the outer diameter is always lined with the folds of the trapezium bottoms and the inner diameter is always lined with the folds of the trapezium tops;

securing the said trapeziform paneled strips in their folded ring structure forms by attachment or adhesive means.

2. A method for fabricating sheet material into disk ring structures as described in claim 1 wherein the said trapeziform panels have curved sides.

3. A method as described in claim 1 wherein the said sheet material is friction paper or friction cloth and wherein the said disk ring structures are friction disk ring structures.

4. A method as described in claim 2 wherein the said sheet material is friction paper or friction cloth and wherein the said disk ring structures are friction disk ring structures.

5. A method as described in claim 3 wherein the said friction paper is a fiber-based sheet material and the said friction cloth is carbon fiber cloth.

6. A method as described in claim 4 wherein the said friction paper is a fiber-based sheet material and the said friction cloth is carbon fiber cloth.

* * * * *